(12) United States Patent
Yoon (10) Patent No.: US 8,213,443 B2
(45) Date of Patent: Jul. 3, 2012

(54) NETWORK SYSTEM

(75) Inventor: Geon Yoon, Gyeonggi-do (KR)

(73) Assignee: LS Industrial Systems Co., Ltd., Seoul (KR)

(*) Notice: Subject to any disclaimer, the term of this patent is extended or adjusted under 35 U.S.C. 154(b) by 945 days.

(21) Appl. No.: 11/564,757

(22) Filed: Nov. 29, 2006

(65) Prior Publication Data

US 2007/0140278 A1 Jun. 21, 2007

(30) Foreign Application Priority Data

Dec. 2, 2005 (KR) .......................... 10-2005-0117235

(51) Int. Cl.
*H04L 12/56* (2006.01)

(52) U.S. Cl. ............................ 370/403; 370/222; 370/258

(58) Field of Classification Search .................... 370/222
See application file for complete search history.

(56) References Cited

U.S. PATENT DOCUMENTS

| | | | |
|---|---|---|---|
| 5,508,689 A * | 4/1996 | Rado et al. ...................... | 340/3.1 |
| 5,600,469 A * | 2/1997 | Yamazaki ........................ | 398/98 |
| 6,065,087 A * | 5/2000 | Keaveny et al. ............... | 710/315 |
| 6,161,011 A * | 12/2000 | Loveless ........................ | 379/56.2 |
| 6,876,652 B1 * | 4/2005 | Bell et al. ....................... | 370/386 |
| 6,961,335 B1 * | 11/2005 | Millet et al. .................... | 370/356 |
| 7,327,221 B1 * | 2/2008 | Callaghan ................. | 340/310.11 |
| 7,480,347 B2 * | 1/2009 | Black et al. .................... | 375/316 |
| 7,505,403 B2 * | 3/2009 | Santoso et al. ................. | 370/219 |
| 7,907,549 B2 * | 3/2011 | Colven et al. .................. | 370/258 |
| 2002/0064163 A1 | 5/2002 | Fujiyama et al. | |

FOREIGN PATENT DOCUMENTS

| | | |
|---|---|---|
| DE | 3413144 | 10/1985 |
| EP | 0557019 | 8/1993 |
| EP | 0734137 | 9/1996 |
| JP | 62-062646 | 3/1987 |
| JP | 64-012736 | 1/1989 |
| JP | 06-112964 | 4/1994 |
| JP | 2000-013501 | 1/2000 |
| JP | 2003-087280 | 3/2003 |
| WO | 02/49271 | 6/2002 |

OTHER PUBLICATIONS

Harald Bögeholz, Johannes Schuster, "FireWire prescht vor: Schnellere serielle Datenübertragung mit IEEE 1394b," Oct. 2003, XP-002426384.

* cited by examiner

*Primary Examiner* — Chi Pham
*Assistant Examiner* — Mohammad Adhami
(74) *Attorney, Agent, or Firm* — Lee, Hong, Degerman, Kang & Waimey (57) ABSTRACT

A hub-free network system is provided in which control systems can operate normally for mutual communications, even though one of the plurality of control systems malfunctions.
Each of the plurality of control systems has a network interface card, and each of the network interface cards has a plurality of communication ports. Each of the network interface cards has a phase structure of ring topology by sequentially connecting a plurality of the communication ports. The plurality of the control systems perform the communications in the phase structure of ring topology, and perform the communications by changing the phase structure of ring topology to a phase structure of bus topology if an error occurs in the communications.

9 Claims, 6 Drawing Sheets

NETWORK SYSTEM

CROSS-REFERENCE TO RELATED APPLICATION

This application claims priority under 35 U.S.C.§119 to Korean Patent Application No. 10-2005-0117235 filed on Dec. 2, 2005, the entirety of which is hereby incorporated by reference.

BACKGROUND

This description relates to a network system and, more particularly, to a network system forming a network by connecting a plurality of control systems to a ring topology, and enabling the control systems to transmit data in both directions so that the control systems can transmit data to each other.

In a control field requiring an organic operation in a plurality of control systems, a communication among the control systems requires a high reliability. The reliability should be secured by performing a proper operation when the communication in the control systems fails. When occurrence of a sudden unstable power supply from outside or communication failure due to malfunction of communication media continues, all the control systems connected to a network system cannot transmit or receive a predetermined data within a predetermined time. The control systems requiring a mutual organic operation are prevented from operating normally if the communication is disabled. The network system involving frequent communication failures cannot be used in the control field.

In a recently-developed control system, a large amount of data is exchanged between PLCs (Programmable Logic Controllers), PLCs and input/output apparatus, and PLCs and PCs (Personal Computers) using an Ethernet methodology, being different from that of the past where input and output functions were major functions. That is, the control systems employing the Ethernet network quickly exchanges data therebetween.

As a result, it is imperative that the control systems improve reliability of the Ethernet network, and overall reliability of the control systems cannot be guaranteed unless reliability of the Ethernet network is obtained. Efforts are being waged for securing the reliability of the entire Ethernet network-based control systems by acquiring and guaranteeing the reliability of the Ethernet-based network in the control systems.

The Ethernet, as one of the in-home private communication-networks, is a local network system where up to 1024 data stations can exchange information with a 10 Mbps of transmission speed within a distance about 2.5 km. Further, transmission media that transmits data can be largely categorized into three types based on transmission data, that is, a 50 Ω coaxial cable (10BASE2, 10BASE5), a twisted pair including a twisted pair cable (10BASE-T), and an optical fiber cable (100BASE-FX).

A maximum bandwidth of the coaxial cable is 10 Mbps, and the maximum transmission distance is 185 m for the 10BASE2 and 500 m for the 10BASE5. The maximum bandwidth of the twisted pair of 10BASE-T is 10 Mbps, and a maximum transmission distance is 100 m. A maximum bandwidth of the optical fiber cable of 100BASE-FX is 100 Mbps, and a maximum transmission distance is 2 km for a multiple mode and several tens of meters for a single mode.

In configuring a network system with the Ethernet, a network system using hubs and having a phase structure of star topology is commonly used. The network system having the phase structure of star topology is composed of a radial shape phase structure having one topology, and a plurality of control systems is connected by the twisted pair cable in one hub.

A communication failure may be generated when the power supplied to a hub being a center of the network system having a phase structure of star topology is unstable or when a hub is operated unstably due to malfunctions. The communication failure disturbs a data transmission in each of the plurality of the control systems. Therefore, it is unsuitable for the network system having the phase structure of star topology to be used in the control field that requires a high reliability.

The network system using a plurality of hubs and having a phase structure of a combination of a star topology and a ring topology is well known. The network system using the plurality of the hubs and having the combined phase structure of star topology and ring topology is such that the plurality of the hubs is connected by the star topology and the ring topology and each of the hubs is connected to the plurality of the control systems by the star topology.

The mutual communication between the plurality of control systems connected to the hubs that operate normally can be performed, even though one of the hubs malfunctions in the network system having the combined phase structure of star topology and ring topology. Therefore, the control systems connected to the hubs that operate normally can perform a normal communication thereamong, even if one of the hubs malfunctions.

However, there is a drawback in the network system having the combined phase structure of star topology and ring topology thus described in that it requires additional plural hubs, and a length of a transmission medium connecting the control systems to the hubs tends to elongate.

SUMMARY

An object is to provide a network system that is composed of only control systems without using hubs.

Another object is to provide a network system capable of achieving a communication between the control systems that operate normally even if one of the control systems malfunctions.

The network system enables to perform a communication among the plurality of control systems by connecting to a phase structure of a ring topology without using separate hubs.

For this, each of the plurality of control systems is disposed with a network interface card, and each of the cards is disposed with a plurality of communication ports. Further, each of the network interface cards is mounted with a phase structure of ring topology by sequentially connecting the plurality of communication ports to transmission media.

Each of the plural transmitting ports selects any one of a coaxial cable communication port connecting a coaxial cable, a twisted pair cable communication port connecting the twisted pair cable, and an optical fiber cable communication port connecting an optical fiber cable in accordance with a discrete distance between the control systems.

Each of the network interface cards comprises: a controller interface unit interfacing the control system and data; a plurality of the medium interface units, each unit mounted with the communication port for interfacing data with an outside; a plurality of signal converters signal—converting each of the data transmitted and received through the plurality of the medium interface units; and a plurality of address designating units disposed between the plurality of the signal converters and the controller interface unit, transmitting the data inputted from the plurality of the signal converters to the controller interface unit, and inserting a physical address for receiving relevant data into a data inputted from the controller interface unit and transmitting the address to the plurality of signal converters.

The network system further comprises a data repeater mutually transmitting the data provided by the plurality of the address designating units, and the plurality of the address designating units determines the physical address included in the data inputted from the plurality of signal converters and provides relevant data to the data repeater if the data is to be repeated.

The data repeater stores the data transmitted by the address designating unit in a queue, and transmits and repeats the data saved in the queue. The queue stores and transmits the data on the base of a First In and First Out (FIFO) queuing method.

Each of the plurality of medium interface units is disposed with a communication port which is one of a medium interface unit capable of being connected to a twisted pair, a medium interface unit capable of being connected to a coaxial cable, and a medium interface unit capable of being connected to an optical fiber cable.

The plurality of signal converters transmits a binary data inputted from the address designating unit to the medium interface unit by converting the binary data into a frequency signal suitable for a signal characteristic of the transmission medium connected to the communication port. Further, the plurality of the signal converters outputs the frequency signal inputted from the medium interface unit to the address designating unit by converting the frequency signal into the binary data.

The transmission medium chooses one of the coaxial cable, the twisted pair cable, and the optical fiber cable according to a discrete distance between the communication ports each disposed at the two network interface cards.

The plurality of control systems perform the mutual communication in a phase structure of ring topology, and performs the communication by converting from the phase structure of ring topology to the phase structure of bus topology if there is generated a disorder in the communication.

BRIEF DESCRIPTION OF THE DRAWINGS

The present invention will now be described in detail with reference to the accompanying drawings through preferred embodiments construed as not limiting the present invention. Throughout some of the drawings, like reference numerals refer to the same or like parts or portions.

DETAILED DESCRIPTION

The present invention is now described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
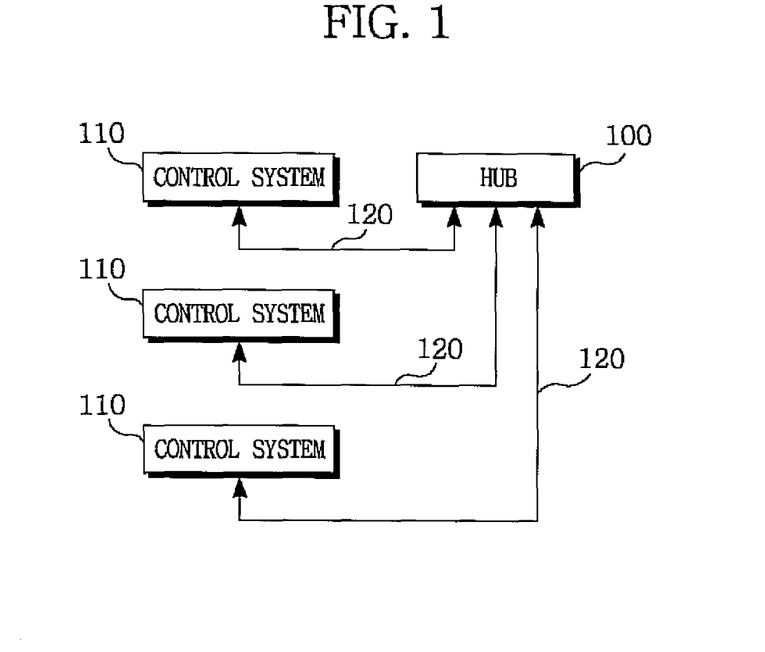
FIG. 1 is a schematic diagram illustrating a configuration of a network system having a phase structure of star topology.

FIG. 1 is a schematic diagram illustrating a configuration of a network system having a phase structure of star topology. Reference numeral 100 represents a hub, and reference numeral 110 refers to a plurality of control systems controlling an operation of various loads except for an electric motor (not shown). The hub 100 and the plurality of the control systems 110 are connected to transmission media through a twisted pair cable 120. That is, a network system having a phase structure of a star topology is shown where a plurality of control systems 110 is connected to a twisted pair cable about a hub 100.

When a predetermined data is transmitted in a plurality of control systems 110, a network system having a phase structure of star topology, should pass through the hub 100. As a result, a communication error may be generated if a power supplied to the hub 100 is unstable or an operation of the hub 100 is unstable, such that the plurality of the control systems 110 may be unable to transmit data to each other.

Therefore, a network system having a phase structure of star topology is not suitable for use in a control field that requires a high reliability of communication.

Figure 2:
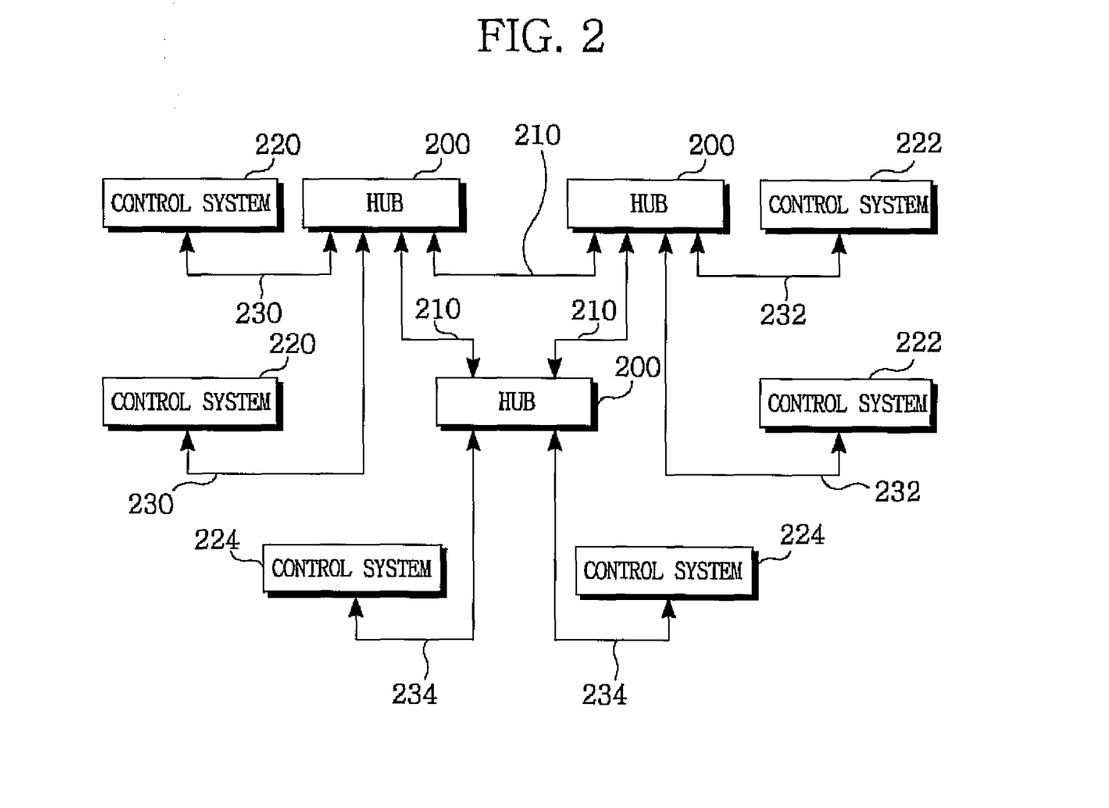
FIG. 2 is a schematic diagram illustrating a configuration of a network system having a combined phase structure of star topology and ring topology.

FIG. 2 is a schematic diagram illustrating a configuration of a network system having a combined phase structure of star topology and ring topology. Here, reference numeral 200 represents a plurality of hubs. The plurality of the hubs 200 has a phase structure of ring topology connected each other through a predetermined transmission medium 210.

Reference numerals 220, 222 and 224 represent a plurality of control systems. Each of the plurality of the control systems 220, 222 and 224 has a phase structure of star topology where each of the plurality of control systems 220, 222 and 224 is connected to each of the plurality of the hubs 200 through predetermined transmission media 230, 232 and 234.

The network system having a combined phase structure of star topology and ring topology is an improvement on a weakness that may be generated in a network system having a phase structure of star topology. That is, even if a communication error is generated by malfunction of a hub in the plurality of hubs 200, the other hubs 200 that operate normally can perform the communication through the transmission medium 210. In other words, the control systems connected to the hubs 200 that operate normally are able to communicate each other.

However, there are drawbacks in that a plurality of hubs 200 should be additionally employed in order to have a phase structure of ring topology, and length of the transmission media 230, 232 and 234 connecting the hubs 200 to the plurality of control systems 220, 222, and 224 comes to be elongated.

Figure 3:
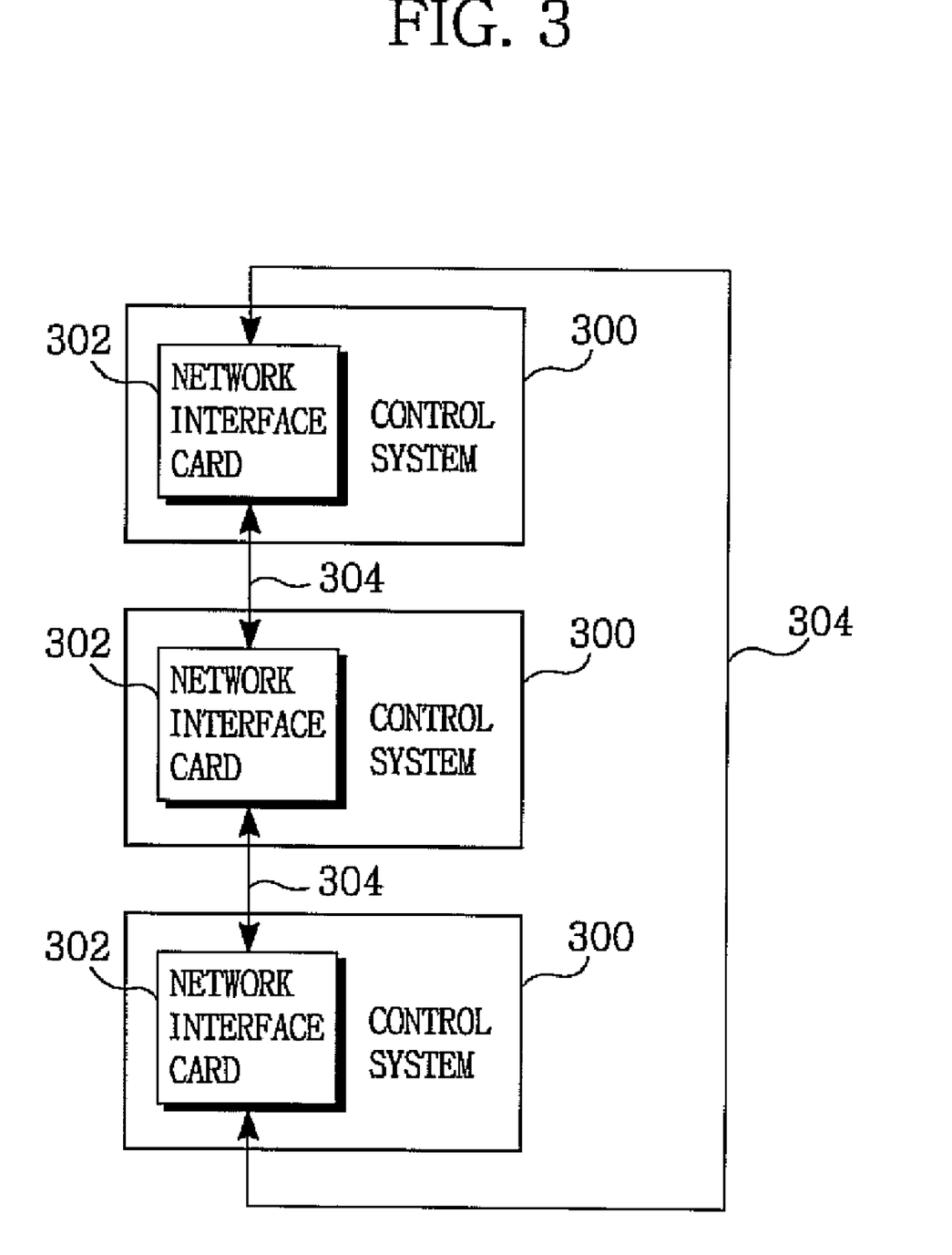
FIG. 3 is a schematic diagram illustrating a configuration of a network system according to a preferred embodiment of the present invention.

FIG. 3 is a schematic diagram illustrating a configuration of a network system according to a preferred embodiment of the present invention, where reference numeral 300 represents a plurality of control systems. Each of the plurality of the control systems 300 has a network interface card 302. The network interface cards 302 disposed at the plurality of the control systems 300 has a phase structure of ring topology sequentially connected to rings through a predetermined transmission medium 304.

Each network interface card 302 performs a data transmission function transmitting data for configuring a network in a phase structure of ring topology, a data receiving function receiving data, and a data repeating function transmitting a data received through a communication port through another communication port. Further, the network interface cards 302 transmit and receive data to fit to types of the transmission media 304.

Further, the network interface cards 302 repeat the data received from a communication port through another communication port, and when a transmission medium connected to a communication port is different from a transmission medium connected to another communication port, the cards repeats the data after converting the data accordance to a signal characteristic required by the transmission medium connected to said another communication port.

If there is generated no communication malfunction in the plurality of control systems 300 and the plurality of transmission media 304, the phase structure of ring topology performs the communication through the network system. Further, if the communication is not performed due to a error generated in at least one or more of the control systems in the plurality of the control systems 300, or an error is generated in a specific location among the plurality of the transmission media 304, the network system should prepare for a communication failure by converting the phase structure of ring topology to the phase structure of bus topology.

That is, the network system of the present invention is configured with a communication channel among the plurality of the control systems 300 by connecting the plurality of control systems 300 to the plurality of transmission media 304 in a phase structure of ring topology to prepare for the communication failure, and transmits data to each other through the communication channel. The transmission media 304 as a physical hierarchy of the communication channel is able to use an coaxial cable, a twisted pair cable, or an optical fiber cable.

Therefore, the network interface cards 302 may be disposed with a coaxial cable communication port capable of connecting a coaxial cable, a twisted pair cable, or an optical fiber cable, a twisted pair cable communication port, or an optical fiber cable communication port. Further, the cards may be equipped with a combined selection of two ports out of the axial cable communication port, the twisted pair cable communication port, and the optical fiber cable communication port.

Figure 4:
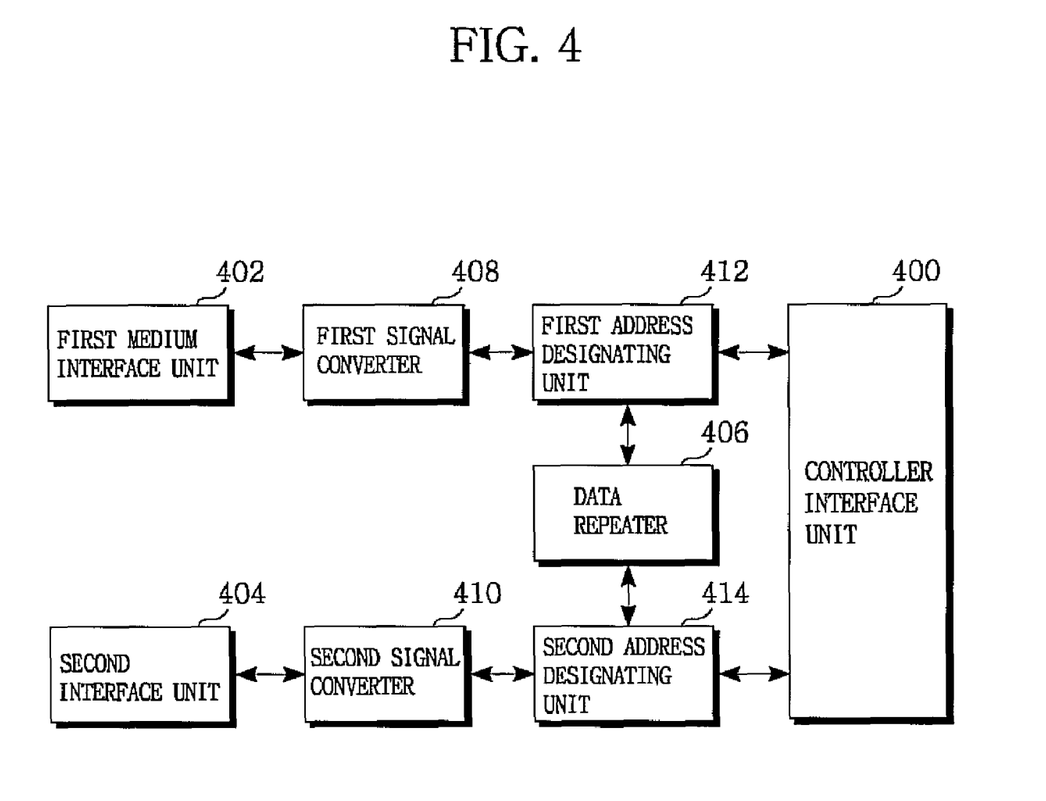
FIG. 4 is a schematic diagram illustrating a configuration of a network interface card disposed at each of the control systems of the network system of FIG. 3.

FIG. 4 is a schematic diagram illustrating a configuration of network interface cards 302. Referring to FIG. 4, each of the network interface cards 302 includes a control interface unit 400 interfacing a controller (not shown) intrinsically arranged in the control system 300 and respective communication ports with which a first interface unit 402 and a second interface unit 404 are disposed to which the transmission media 304 are connected.

Furthermore, a data repeater 406, first and the second address designating units 408 and 410, and first and second signal converters 412 and 414 are interposed between the controller interface unit 400 and the first and the second media interface units 402 and 404.

The data repeater 406 which is, for example, a packet buffer saves and outputs packet data to be repeated to outside.

The first and second address designating units 408 and 410 compares a physical address contained in a received data packet with own physical address to determine whether the relevant data packet is a data packet to be repeated or a data packet to be transmitted to the controller. If the received data packet is data packet to be repeated, the address designating unit stores the data packet in the data repeater 406 and repeats the data packet. Further, if the received data packet is the data packet to be transmitted to the controller, the address designating unit transmits the data packet to the controller through the controller interface unit 400.

The first and second address designating units 412 and 414 insert to the data packet transmitted through the control interface unit 400 a physical address of the control system receiving the relevant data packet.

The first and second signal converters 412 and 414 convert the binary data of the data packet inputted from the first and second address designating units 408 and 410 to a frequency signal fit to a signal characteristic of the transmission media connected to the first and second media interface units 402 and 404 and transmit to the first and second media interface units 402 and 404.

Further, the first and second signal converters 412 and 414 convert the frequency signal received through the first and second media interface units 402 and 404 to data packet of binary data and transmit to the first and second address designating units 412 and 414.

When the controller of the network interface cards configured as above transmits a predetermined data packet to another outside control system, the controller transfers the data packet to the first address designating unit 412 through the controller interface unit 400.

The first address designating unit 412 inserts into the transmitted data packet a physical address of the outside control system receiving the relevant data packet, and the data packet into which the physical address is inserted is transferred to the first signal converter 408.

The first signal converter 408 converts to a frequency signal the binary data of the data packet inputted from the first address designating unit 412 in accordance with the signal characteristic of the transmission medium connected to the communication port of the first media interface unit 402. The frequency signal converted is transmitted to outside from the first media interface unit 402 through a transmission medium. Here, the first media interface unit 402 may be so configured as to be suitable for the transmission media such as the coaxial cable, the twisted pair cable, the optical fiber cable and etc. Therefore, changes in the data packet or changes in communication protocols are not generated due to changes of the transmission media.

Further, the data packet provided by the controller may be transmitted to outside through the second address designating unit 414, the second signal converter 410, and the second media interface unit 404.

The detailed description on the operation that the data packet provided by the controller are transmitted to outside through the second address designating unit 414, the second signal converter 410, and the second media interface unit 404 will be omitted because it is the same as that through the first address designating unit 412, the first signal converter 408, and the first media interface unit 402.

If a predetermined frequency signal is inputted to the first interface unit 402 through a predetermined transmission media from outside, the first media interface unit 402 transfers the received frequency signal to the first signal converter 408.

The first signal converter 408 outputs the frequency signal inputted from the first media interface unit 402 to the first address designating unit 412 by converting a binary data to a data packet.

The first address designating unit 412 determines whether the data packet is to be repeated or to be transferred to the controller by judging a physical address in the data packet inputted from the first signal converter 408. That is, each of the control systems is provided with its own physical address, and the first address designating unit 412 compares the physical address in the data packet with the physical address previously given to the control system. If both physical addresses are the same to each other, the first address designating unit 412 transfers the data packet to the controller through the controller interface unit 400. Further, if it is determined that the physical addresses are different from each other, the first address designating unit 412 stores the relevant data packet in the data repeater 406.

The data repeater 406 stores in a temporarily-storing queue the data packet provided by the first address designating unit 412. The queue operating on the base of a First In and First Out (FIFO) queuing method transmits the data packet to the second address designating unit 414.

The second addressing unit 414 transmits the data packet inputted from the data repeater 406 to the second signal converter 410. The second signal converter 410 converts the binary data of the data packet inputted from the second address designating unit 414 to a frequency signal in response to the signal characteristic of the transmission medium connected to the communication port of the second media interface unit 404. The converted frequency signal is transmitted to outside from the second media interface unit 404 through the transmission medium.

Furthermore, a detailed operation in which process of the frequency signals received from the outside to the second interface unit 404 through the transmission medium is omitted in its description because it is the same as that of the frequency signal transmitted to the first interface unit 402.

The network interface cards configured as above is disposed with a network system having a phase structure of ring topology by connecting a coaxial cable, a twisted pair cable, or an optical fiber cable.

Figure 5:
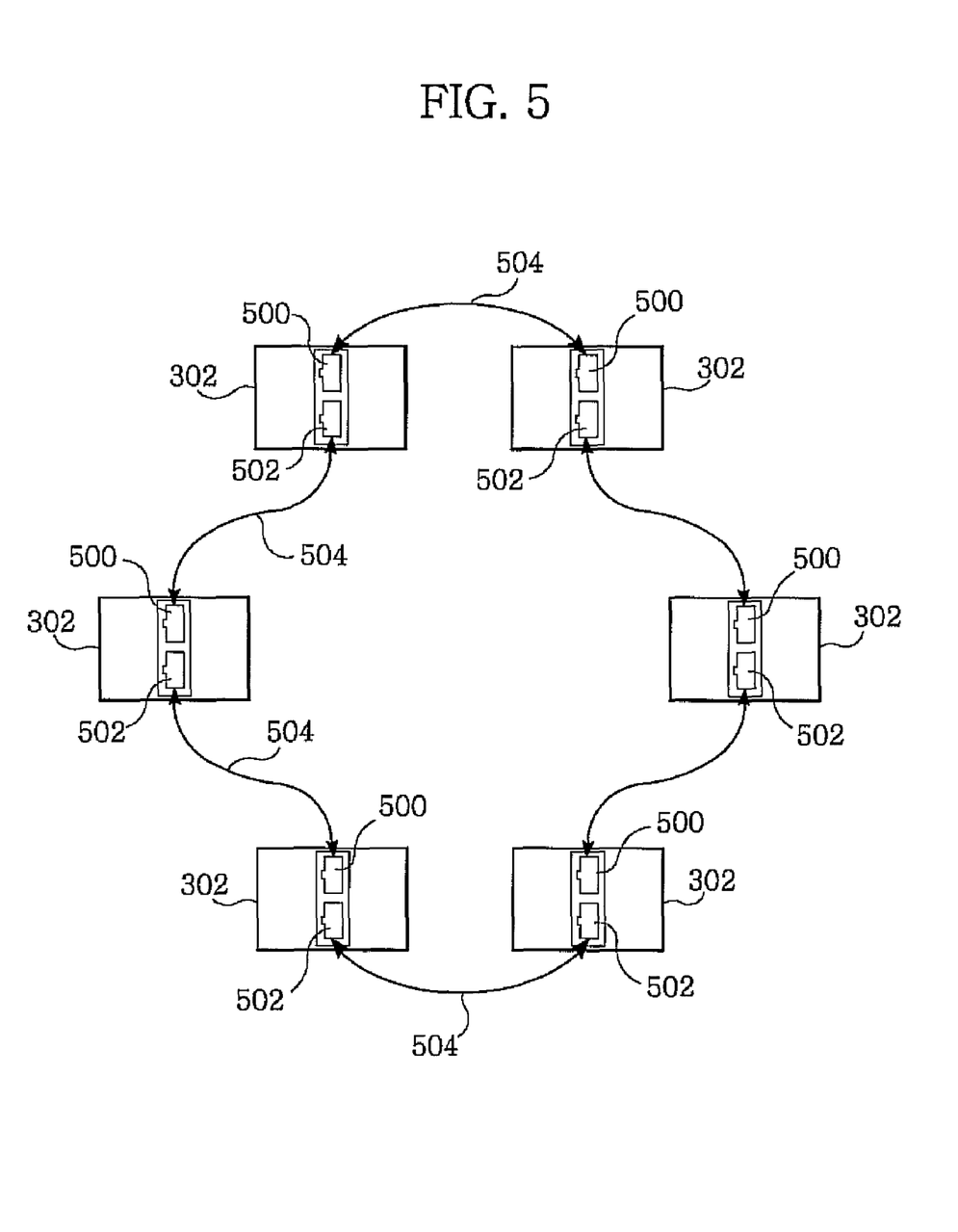
FIG. 5 is a schematic diagram illustrating a network of a network system in which network interface cards are connected by a twisted pair cable.

FIG. 5 is a schematic diagram illustrating a network of a network system by connecting network interface cards by a twisted pair cable. Referring to FIG. 5, the network interface card 302 disposed at each of the plurality of the control systems 300 includes a twisted pair cable communication ports 500 and 502 capable of connecting the twisted pair cable to the first and the second media interface unit 402 and 404 via a transmission medium.

The twisted pair cable communication ports 500 and 502 is so configured as to allow the plurality of control systems to have a phase structure of a ring topology by being connected via a twisted pair cable 504 between the twisted pair cable communication ports equipped at a network interface card of the another control system.

As a maximum transmission distance for the twisted pair cable 504 is restrained to 100 m, there is a limit in integrating the widely-distributed control systems to a single network system. Therefore, it is desirable to construct a network system in another embodiment of the present invention by using an optical fiber cable having a long transmission distance if an area where the plurality of control systems are distributed is not that wide and a communication of high reliability is required.

Figure 6:
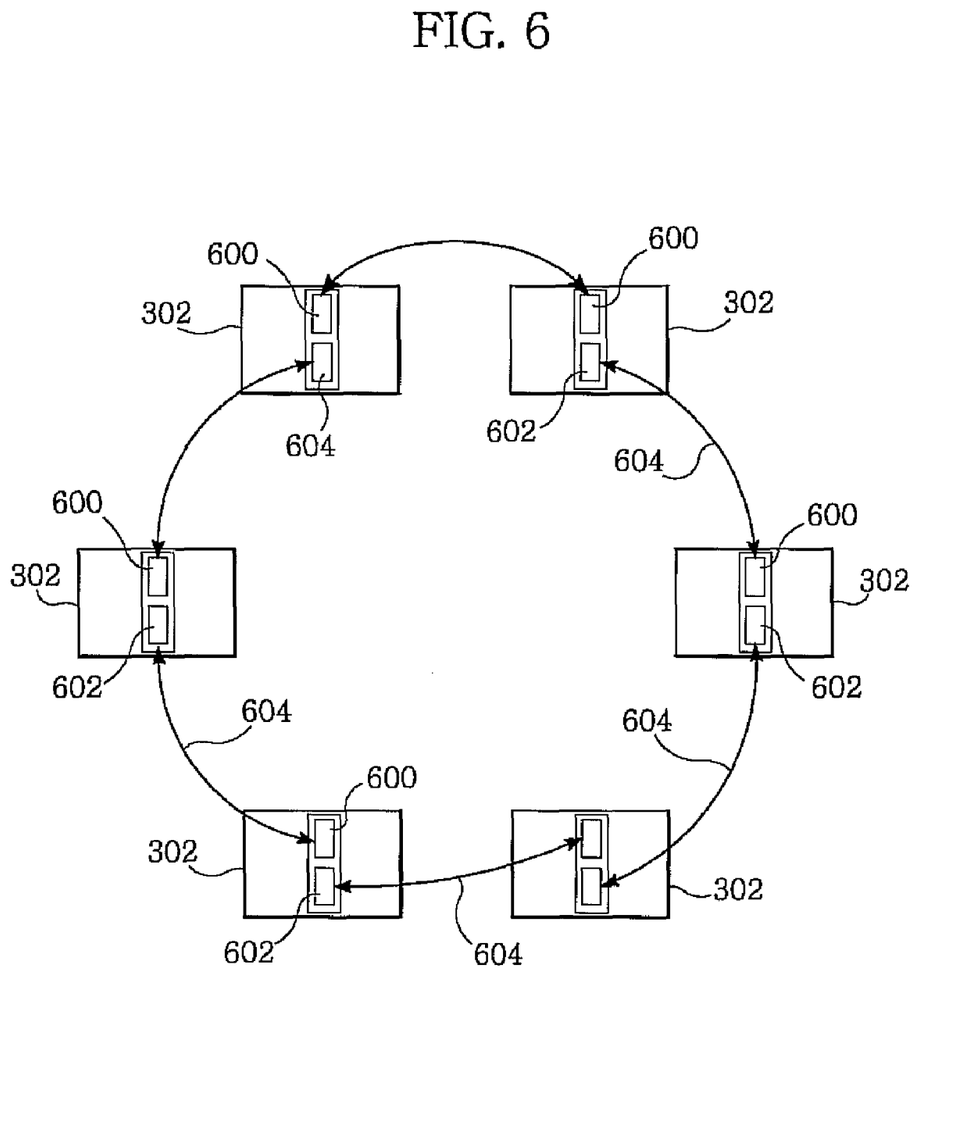
FIG. 6 is a schematic diagram illustrating a network of a network system in which network interface cards are connected by an optical fiber cable.

FIG. 6 is a schematic diagram illustrating a network of a network system configured by connecting interface cards via an optical fiber cable. Referring to FIG. 6, first and second media interface units 402 and 404 of the network interface bards 302 each disposed at a plurality of control systems 300 are provided with optical fiber communication ports 600 and 602 capable of connecting an optical cable to the transmission medium 304. The optical fiber cable communication ports 600 and 602 are connected by an optical fiber cable 604 in between optical fiber cable communication ports disposed at network interface cards of another control system to allow a plurality of control systems to configure a phase structure of a ring topology.

In case of configuring a network system by using the optical fiber cable 604, a maximum possible transmission distance is several tens of kilometers. Therefore, it is desirable to construct a network system by using an optical fiber cable when a plurality of control systems is widely distributed.

It is also desirable to configure a network system by combining suitable cables in accordance with a wide area and a narrow area when a plurality of control systems is mixedly distributed over the wide and narrow areas.

A network system constructed by combining a twisted pair cable and an optical cable may be shown in still another preferred embodiment of the present invention.

Figure 7:
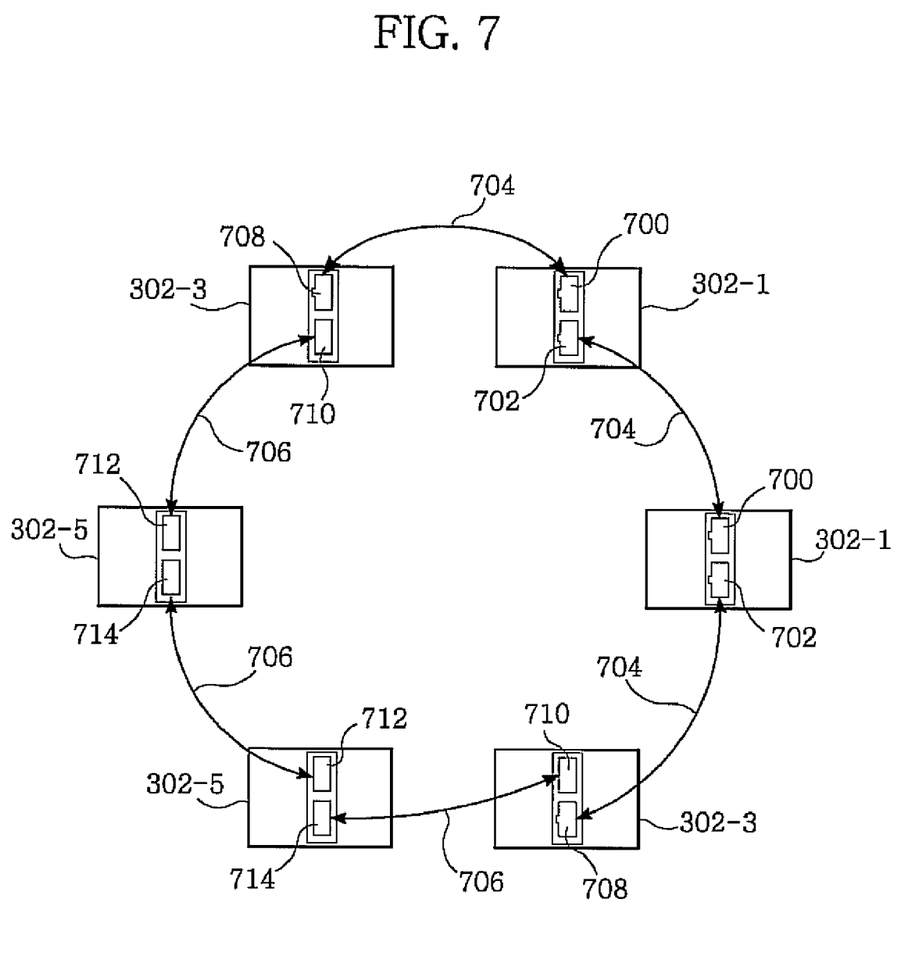
FIG. 7 is a schematic diagram illustrating a network of a network system in which network interface cards are connected by twisted pair cable and an optical fiber cable.

FIG. 7 is a schematic diagram illustrating a network of a network system configured by connecting network interface cards via a twisted pair cable and an optical fiber cable.

Referring to FIG. 7, it is assumed that a plurality of control systems having network interface cards 302-1 and 302-3 is distributed at a narrow area, while a plurality of control systems having network interface cards 302-3 and 302-5 is distributed at a wide area, both control systems being distanced far apart. In this case, a plurality of network interface cards 302-1 is mounted with twisted pair cable communication ports 700 and 702 capable of connecting a twisted pair cables 704. Further, the plurality of interface cards 302-3 to be connected to the plurality of the interface cards 302-1 and 302-5 is mounted with a twisted pair cable communication port 708 capable of connecting a twisted pair cable 704 and an optical fiber cable communication port 710 capable of connecting an optical fiber cable 706. Still furthermore, the plurality of network interface cards 302-5 is configured with optical fiber cable communication ports 712 and 714 capable of connecting the optical fiber cable 706.

A phase structure of ring topology is configured in such a manner that the twisted pair cable communication ports 700, 702, and 708 of the plurality of the network interface cards 302-1 and 302-3 are sequentially connected by the twisted pair cable 704, and the optical fiber cable communication ports 710, 712, and 714 of the plurality of the network interface cards 302-3 and 302-3 are sequentially connected by an optical fiber cable.

A plurality of control system in still another preferred embodiment of the present invention may show an effective network system in which the control systems can communicate in case the plurality of control systems is mixedly distributed at a wide area and a narrow area.

The present invention may also construct a network system having a phase structure of ring topology by employing a coaxial cable in addition to a twisted pair cable and an optical fiber cable, or a combination of the coaxial cable, the twisted pair cable and the optical fiber cable as well.

A detailed description on the network system configuration using only an coaxial cable, or using a combination of the coaxial cable, the twisted pair cable, the optical fiber cable is omitted as it is the same as that explained in FIGS. 5 to 7.

Therefore, the network interface cards 302 may be classified into four types based on kinds of transmission media connected to communication ports, that is, cards connected only by a twisted pair cable, cards connected only by a coaxial cable, cards connected only by an optical fiber cable, and cards connected by two kinds of cables selected from among the twisted pair cable, the coaxial cable, and the optical fiber cable.

It is desirable for a plurality of control systems to be configured with a network system of a phase structure in ring topology by having a suitable network interface cards 302 in accordance with a distance between other control systems connected to the plurality of the control systems itself.

For instance, a network interface card 302 capable of connecting a twisted pair cable or a coaxial cable is equipped if a distance between a plurality of control systems is within 100 m. A network interface card 302 capable of connecting an optical fiber cable is equipped if a distance between the control systems is 100 m or more. Further, a network system of a phase structure in ring topology is constructed by employing a combined network interface card 302 capable of connecting both the twisted pair cable and the optical fiber cable, or connecting both the coaxial cable and the optical fiber cable, if a distance between other control systems connected with the control system is within 100 m and more than 100 m.

As apparent from the foregoing, there is an advantage in the network system thus described according to the present invention in that a network system having a phase structure of ring topology can be constructed only with a plurality of control systems using no hubs, thereby improving reliability in communications by preventing communication failures caused by malfunctions of the hubs.

Another advantage is that a network interface card capable of using one or more suitable cables among a coaxial cable, a twisted pair cable, and an optical fiber cable as a transmission medium may be constructed. As a result, a plurality of control systems is able to communicate each other irrespective of width of distributed areas thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A network system comprising:
a plurality of control systems;
a network interface card mounted in each of the plurality of control systems, wherein the network interface card comprises:
at least two communication ports, wherein each of the at least two communication ports selects a coaxial cable communication port for connecting a coaxial cable, a twisted pair cable communication port for connecting a twisted pair cable, or an optical fiber communication port for connecting an optical fiber cable for a data connection, such that each of the at least two communication ports is configured to utilize a different type of data connection or a same type of data connection;
a controller interface unit configured to interface data with one of the plurality of control systems;
a media interface unit connected with each of the at least two communication ports and configured to interface the data with other terminals;
a first address designating unit interposed between a signal converter and the controller interface;
the signal converter configured to convert data input from the first address designating unit to the media interface unit by converting binary data into an analog frequency signal according to a signal characteristic of the data connection;
a first data repeater configured to transmit a data packet received from the first address designating unit to a second address designating unit of one of the plurality of control systems,
wherein the first address designating unit is configured to:
compare a physical address of the data packet with a physical address previously provided to the control system,
transmit the data packet through the controller interface unit to the one of the plurality of control systems when the physical addresses are the same, and
transmit the data packet through the controller interface unit to the first data repeater when the physical addresses are different; and
a transmission media configured to connect each of the at least two communication ports with at least two other communication ports of one of the plurality of control systems in sequence so that the plurality of control systems has a phase structure of a ring topology.

2. The network system according to claim 1, wherein the second address designating unit provides the data packet to a second data repeater associated with the second address designating unit if it is determined that the data packet should be repeated according to the physical address included in the data.

3. The network system according to claim 2, wherein the first data repeater stores the data packet transmitted by the first address designating unit in a queue and transmits the data packet stored in the queue.

4. The network system according to claim 3, wherein the queue stores and transmits the data packet according to a First In and First Out (FIFO) queuing method.

5. The network system according to claim 1, wherein the signal converter is further configured to output the analog frequency signal to the first address designating unit by converting the analog frequency signal into binary data.

6. The network system according to claim 1, wherein the transmission media is the coaxial cable, the twisted pair cable, or the optical fiber cable.

7. The network system according to claim 6, wherein the network interface card chooses the data connection of one of the at least two communication ports according to a discrete distance between the at least two communication ports of one of the plurality of control systems and another of the at least two communication ports of another one of the plurality of control systems.

8. The network system according to claim 1, wherein the phase structure of the ring topology is changed to a phase structure of a bus topology if an error occurs in the communication of the plurality of control systems.

9. The network system according to claim 1, wherein the first address designating unit is configured to transmit data input from the signal converter to the controller interface unit and to transmit data to the signal converter by inserting a physical address of one of the plurality of control systems receiving the data.

* * * * *